(12) United States Patent
Nagarathinam et al.

(10) Patent No.: US 11,268,723 B2
(45) Date of Patent: Mar. 8, 2022

(54) DETERMINING OPTIMAL DECISION PARAMETERS FOR A DEMAND RESPONSE EVENT INVOLVING A DISTRICT COOLING PLANT

(71) Applicant: Tata Consultancy Services Limited, Mumbai (IN)

(72) Inventors: Srinarayana Nagarathinam, Chennai (IN); Harihara Subramaniam Muralidharan, Chennai (IN); Arunchandar Vasan, Chennai (IN); Venkatesh Sarangan, Chennai (IN); Anand Sivasubramaniam, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 275 days.

(21) Appl. No.: 16/793,413

(22) Filed: Feb. 18, 2020

(65) Prior Publication Data
US 2020/0263893 A1 Aug. 20, 2020

(30) Foreign Application Priority Data
Feb. 18, 2019 (IN) .............................. 201921006308

(51) Int. Cl.
*F24F 11/46* (2018.01)
*F24F 11/63* (2018.01)
(Continued)

(52) U.S. Cl.
CPC .............. *F24F 11/46* (2018.01); *F24F 11/63* (2018.01); *G05B 19/042* (2013.01); *H02J 3/144* (2020.01); *G05B 2219/2614* (2013.01)

(58) Field of Classification Search
None
See application file for complete search history.

(56) References Cited

U.S. PATENT DOCUMENTS 8,676,394 B2 3/2014 Lo et al.
9,581,979 B2 2/2017 Gheerardyn et al.
(Continued)

OTHER PUBLICATIONS

Ji Hoon Yoon, Ross Baldick & Atila Novoselac (2016) Demand response control of residential HVAC loads based on dynamic electricity prices and economic analysis, Science and Technology for the Built Environment, 22:6, 705-719, DOI: 10.1080/23744731.2016.1195659 (Year: 2016).*

(Continued)

*Primary Examiner* — Kenneth M Lo
*Assistant Examiner* — Istiaque Ahmed
(74) *Attorney, Agent, or Firm* — Finnegan, Henderson, Farabow, Garrett & Dunner, LLP

(57) ABSTRACT

The present disclosure provides system and method for determining optimal decision parameters for a demand response (DR) event involving a District Cooling Plant (DCP). Most of conventional DR event techniques address control of building-level energy consumption loads alone while in presence of District Cooling (DC) has not received much attention when a plurality of buildings are served by a District Cooling Plant (DCP). The disclosed system and method determine set points of optimal decision parameters of the plurality of buildings and the DCP, by conditioning and un-conditioning on the DCP parameters such that a thermal discomfort of occupants residing in the plurality of buildings is minimum and achieves a maximum target energy demand reduction during the DR event. The disclosed system and method work for hundreds of buildings and able to determine the optimal decision parameters for each building and the DCP efficiently.

15 Claims, 9 Drawing Sheets

(51) Int. Cl.
 H02J 3/14 (2006.01)
 G05B 19/042 (2006.01)

(56) References Cited

U.S. PATENT DOCUMENTS

| | | | |
|---|---|---|---|
| 10,241,528 B1* | 3/2019 | Frader-Thompson | .... H02J 3/14 |
| 2014/0303797 A1* | 10/2014 | Kitajima | ........ G05B 15/02 |
| | | | 700/291 |
| 2017/0163039 A1 | 6/2017 | Schwarz et al. | |
| 2018/0195752 A1* | 7/2018 | Sasaki | ........ F24F 11/80 |
| 2021/0068673 A1* | 3/2021 | Srebric | ........ A61B 5/0008 |

OTHER PUBLICATIONS

Rifai, S.M.M. et al. (Mar. 2013). "Demand Response Management of a District Cooling Plant of Mixed Use Development," *SLEMA Journal*, vol. 16, No. 1; pp. 15-23.

Bhattacharya, S. et al. "DReAM: Demand Response Architecture for Multi-level District Heating and Cooling Networks," *e-Energy '17*, pp. 353-359.

* cited by examiner

DETERMINING OPTIMAL DECISION PARAMETERS FOR A DEMAND RESPONSE EVENT INVOLVING A DISTRICT COOLING PLANT

PRIORITY CLAIM

This U.S. patent application claims priority under 35 U.S.C. § 119 to: Indian Patent Application No. 201921006308, filed on 18 Feb. 2019.

TECHNICAL FIELD

The disclosure herein generally relates to energy consumption management in facilities, and particularly to system and method for determining optimal decision parameters for a demand response event involving a District Cooling Plant (DCP) for achieving a target demand energy reduction.

BACKGROUND

Demand response (DR) is used by electrical utilities for managing a demand-side energy load during an anticipated shortage in electricity supply. Electricity consumers such as buildings and other stand-alone power consumption units that are registered to participate in a DR event may reduce their loads in response to a DR signal from an electrical utility to avoid using expensive or potentially polluting stand-by generators during a peak power demand situations. Heating, Ventilation and Air-conditioning (HVAC) units and lighting units that may be present in a building are identified as key energy consumption units and may be accountable for majority of energy consumption of the building. Controlling temperature set points to reduce load of the HVAC units and dimming or turning-off the lighting units to reduce load of the lighting units are some of the most commonly practiced methods for building level target demand energy reduction during the DR event. However such common methods may impact thermal comfort and ambient conditions for occupants present in the building.

On the other hand, District Cooling (DC) is an emerging technology being used especially in high energy intensity geographies such as Dubai, Singapore, Hong Kong, and so on. The DC comprises a centralized District Cooling Plant (DCP) to generate and supply cold water with predefined temperature to a collection of buildings present across a city through an insulated pipe network. The buildings individually use pumps and air-handling units (AHUs) that exchange heat with the cold water supplied by the DCP to generate cool air for conditioning indoor spaces. The buildings then return warm water to the DCP. Cooling loads of collection of the buildings are thus aggregated and off-loaded to the DCP. Considering the load being handled, the electrically operated DCP may also be a major electricity consumer of the electric utility apart from the buildings.

Therefore, the DR event should consider both the DCP and the buildings together as the buildings alone (without the DCP) may not be able to meet a relatively high overall target demand energy reduction during the DR event. However, most of existing techniques for load management in case of the DR event are limited to building level target demand energy reduction by controlling on-site split air-conditioners (ACs) or building-dedicated HVAC units in the DR event. In some of the existing systems, operating hours of flexible loads and/or changing a thermostat setting of ACs have been implemented in residential buildings. In case of commercial buildings, a common technique for load management during the DR event is controlling of HVAC and lighting loads. Rule-based strategies such as pre-cooling and/or lighting control, occupancy-based demand response strategies and associated thermal comfort of occupants in the buildings specifically for integration of renewable energy source in the electrical utilities are some of other techniques available for load management in the DR event, but they are also limited to smaller number of buildings. A snapback effect that triggers a peak power demand for the buildings immediately after the DR event is also a major concern for the electrical utilities for achieving the maximum possible target demand energy reduction.

More recent studies reveal optimization of a building supply water temperature by controlling a pump flowrate at an intake station for achieving the target demand energy reduction during the DR event has been analyzed, but when a district heating is employed. However considering the DCP as a participant along with considerable number of buildings during the DR event to achieve the target demand energy reduction is a challenging problem due to various interdependent decision parameters of the buildings such as temperature set points and lighting intensity factors and a supply water temperature of the DCP. Moreover determining optimal decision parameters of the buildings and the DCP during the DR event for achieving the target demand energy reduction by minimizing the thermal comfort of occupants of the buildings and the snapback effect is more complex to scale and is technically challenging.

SUMMARY

Embodiments of the present disclosure present technological improvements as solutions to one or more of the above-mentioned technical problems recognized by the inventors in conventional systems.

In an aspect, there is provided a processor implemented method for determining optimal decision parameters for a Demand Response (DR) event involving a District Cooling Plant (DCP) serving at least some of a plurality of buildings, wherein the DCP and each of the at least some of the plurality of buildings are configured to participate with an associated electrical utility from a plurality of electrical utilities in the DR event, wherein each of the at least some of the plurality of buildings and the DCP comprises one or more power consuming units, the method comprising the steps of: (a) receiving input parameters from the associated electrical utility, by one or more hardware processors, wherein the input parameters comprise a time interval of the DR event, a total target energy reduction value ($R_T$) to be achieved after the DR event, an initial supply chilled water temperature value ($T_s$) of the DCP from a predefined range and an initial demand energy reduction value ($R_D^{(n)}$) of the DCP, wherein an initial value of n is zero and the time interval of the DR event comprises a start time (t) and an end time (t+T) where T is a total time duration of the DR event; (b) determining an energy reduction vector (R) comprising an energy reduction value ($R_x$) for each building (x) of the at least some of the plurality of buildings such that (i) a total thermal discomfort value ($\Sigma_B \Gamma_x$) of occupants thereof is minimum, by the one or more hardware processors, wherein the total thermal discomfort value ($\Sigma_B \Gamma_x$) of occupants is a sum of a thermal discomfort value ($\Gamma_x$) of occupants for each building (x) of the at least some of the plurality of buildings and (ii) a sum of energy reduction value ($\Sigma_B R_x$) thereof and the initial demand energy reduction value ($R_D^{(n)}$) of the DCP is greater than or equal to the total target energy reduction value ($R_T$); (c) identifying, by the one or more hardware processors, a temperature set point ($T_{SP}$) and a lighting intensity factor ($L_f$) for each building (x) of the at least some of the plurality of buildings based on an associated energy reduction value ($R_x$) using a look-up table and by using an inverse mapping technique; (d) extracting, by the one or more hardware processors, a cooling load ($Q_x(t)$) for each building (x) of the at least some of the plurality of buildings and a chilled water mass flow rate ($m_x(t)$) thereof based on an associated temperature set point ($T_{SP}$) and an associated lighting intensity factor ($L_f$), using a British Thermal Units (BTU) meter installed in a corresponding building; (e) calculating, by the one or more hardware processors, a cooling load ($Q_D(t)$) of the DCP and a chilled water mass flowrate ($m_D(t)$) of the DCP by summing cooling loads and chilled water mass flow rates of each building (x) of the at least some of the plurality of buildings respectively; (f) estimating, by the one or more hardware processors, an intermediate energy reduction value ($R_D^{(*)}$) of the DCP based on the cooling load ($Q_D(t)$) of the DCP and the chilled water mass flowrate ($m_D(t)$) of the DCP using a chiller performance curve and a pump performance curve of the DCP; (g) determining, by the one or more hardware processors, a new demand energy reduction value ($R_D^{(n+1)}$) of the DCP based on the initial demand energy reduction value ($R_D^{(n)}$), the intermediate energy reduction value ($R_D^{(*)}$) and a relaxation parameter $\beta$; (h) iteratively performing, by the one or more hardware processors, steps (a) through (g) by taking the new demand energy reduction value ($R_D^{(n+1)}$) of the DCP as the initial demand energy reduction value ($R_D^{(n)}$) of the DCP until a condition $|R_D^{(n+1)} - R_D^{(n)}| < \varepsilon$ is satisfied, wherein a value of $\varepsilon$ is 0.001; (i) capturing, via the one or more hardware processors, the associated temperature set point ($T_{SP}$) and the associated lighting intensity factor ($L_f$) for each building (x) of the at least some of the plurality of buildings along with the total thermal discomfort value ($\Sigma_B \Gamma_x$) of occupants thereof and a peak power value ($P_W^{DR}$) during the DR event, for the initial supply chilled water temperature value ($T_s$) of the DCP; (j) iteratively performing, by the one or more hardware processors, steps (a) through (i) for remaining supply chilled water temperature values ($T_s$) of the DCP from the predefined range and capturing the associated temperature set point ($T_{SP}$) and the associated lighting intensity factor ($L_f$) for each building (x) of the at least some of the plurality of buildings along with an associated total thermal discomfort value ($\Sigma_B \Gamma_x$) of occupants thereof and an associated peak power value ($P_W^{DR}$) during the DR event, for each of the remaining supply chilled water temperature values ($T_s$); and (k) identifying, by the one or more hardware processors the associated temperature set point ($T_{SP}$) and the associated lighting intensity factor ($L_f$) for each building (x) of the at least some of the plurality of buildings for an associated supply chilled water temperature value ($T_s$) as optimal decision parameters in the event that an associated total thermal discomfort value ($\Sigma_B \Gamma_x$) of occupants thereof is minimum and a snapback condition is satisfied, wherein the snapback condition occurs when the associated peak power value ($P_W^{DR}$) during the DR event is less than or equal to a peak power value ($\overline{P_W^{DR}}$) during a non DR event.

In another aspect, there is provided a system for determining optimal decision parameters for a demand response (DR) event involving a District Cooling Plant (DCP) serving at least some of a plurality of buildings, wherein the DCP and each of the at least some of the plurality of buildings are configured to participate with an associated electrical utility from a plurality of electrical utilities in the DR event, wherein each of the at least some of the plurality of buildings and the DCP comprises one or more power consuming units, the system comprising: one or more data storage devices operatively coupled to one or more hardware processors and configured to store instructions which when executed cause the one or more hardware processors to: (a) receive input parameters, from the associated electrical utility, wherein the input parameters comprises a time interval of the DR event, a total target energy reduction value ($R_T$) to be achieved after the DR event, an initial supply chilled water temperature value ($T_s$) of the DCP from a predefined range and an initial demand energy reduction value ($R_D^{(n)}$) of the DCP, wherein an initial value of n is zero and the time interval of the DR event comprises a start time (t) and an end time (t+T) where T is a total time duration of the DR event; (b) determine an energy reduction vector (R) comprising an energy reduction value ($R_x$) for each building (x) of the at least some of the plurality of buildings such that (i) a total thermal discomfort value ($\Sigma_B \Gamma_x$) of occupants thereof is minimum, wherein the total thermal discomfort value ($\Sigma_B \Gamma_x$) of occupants is a sum of a thermal discomfort value ($\Gamma_x$) of occupants for each building (x) of the at least some of the plurality of buildings and (ii) a sum of energy reduction value ($\Sigma_B R_x$) thereof and the initial demand energy reduction value ($R_D^{(n)}$) of the DCP is greater than or equal to the total target energy reduction value ($R_T$); (c) identify a temperature set point ($T_{SP}$) and a lighting intensity factor ($L_f$) for each building (x) of the at least some of the plurality of buildings based on an associated energy reduction value ($R_x$) using a look-up table and by using an inverse mapping technique; (d) extract a cooling load ($Q_x(t)$) for each building (x) of the at least some of the plurality of buildings and a chilled water mass flow rate ($m_x(t)$) thereof based on an associated temperature set point ($T_{SP}$) and an associated lighting intensity factor ($L_f$), using a British Thermal Units (BTU) meter installed in a corresponding building; (e) calculate a cooling load ($Q_D(t)$) of the DCP and a chilled water mass flowrate ($m_D(t)$) of the DCP by summing cooling loads and chilled water mass flow rates of each building (x) of the at least some of the plurality of buildings respectively; (f) estimate an intermediate energy reduction value ($R_D^{(*)}$) of the DCP based on the cooling load ($Q_D(t)$) of the DCP and the chilled water mass flowrate ($m_D(t)$) of the DCP using a chiller performance curve and a pump performance curve of the DCP; (g) determine a new demand energy reduction value ($R_D^{(n+1)}$) of the DCP based on the initial demand energy reduction value ($R_D^{(n)}$), the intermediate energy reduction value ($R_D^{(*)}$) and a relaxation parameter $\beta$; (h) iteratively perform steps (a) through (g) by taking the new demand energy reduction value ($R_D^{(n+1)}$) of the DCP as the initial demand energy reduction value ($R_D^{(n)}$) of the DCP until a condition $|R_D^{(n+1)} - R_D^{(n)}| < \varepsilon$ is satisfied, where a value of $\varepsilon$ is 0.001; (i) capture the associated temperature set point ($T_{SP}$) and the associated lighting intensity factor ($L_f$) for each building (x) of the at least some of the plurality of buildings along with the total thermal discomfort value ($\Sigma_B \Gamma_x$) of occupants thereof and a peak power value ($P_W^{DR}$) during the DR event, for the initial supply chilled water temperature value ($T_s$) of the DCP; (j) iteratively perform steps (a) through (i) for remaining supply chilled water temperature values ($T_s$) of the DCP from the predefined range and capture the associated temperature set point ($T_{SP}$) and the associated lighting intensity factor ($L_f$) for each building (x) of the at least some of the plurality of buildings along with an associated total thermal discomfort value ($\Sigma_B \Gamma_x$) of occupants thereof and an associated peak power value ($P_W^{DR}$) during the DR event, for each of the remaining supply chilled water temperature values ($T_s$); and (k) identify the associated temperature set point ($T_{SP}$) and the associated lighting intensity factor ($L_f$) for each building (x) of the at least some of the plurality of buildings for an associated supply chilled water temperature value ($T_s$) as optimal decision parameters in the event that an associated total thermal discomfort value ($\Sigma_B \Gamma_x$) of occupants thereof is minimum and a snapback condition is satisfied, wherein the snapback condition occurs when the associated peak power value ($P_W^{DR}$) during the DR event is less than or equal to a peak power value ($\overline{P_W^{DR}}$) during a non DR event.

In yet another aspect, there is provided a computer program product comprising a non-transitory computer readable medium having a computer readable program embodied therein, wherein the computer readable program, when executed on a computing device, causes the computing device to: (a) receive input parameters, from the associated electrical utility, wherein the input parameters comprises a time interval of the DR event, a total target energy reduction value ($R_T$) to be achieved after the DR event, an initial supply chilled water temperature value ($T_s$) of the DCP from a predefined range and an initial demand energy reduction value ($R_D^{(n)}$) of the DCP, wherein an initial value of n is zero and the time interval of the DR event comprises a start time (t) and an end time (t+T) where T is a total time duration of the DR event; (b) determine an energy reduction vector (R) comprising an energy reduction value ($R_x$) for each building (x) of the at least some of the plurality of buildings such that (i) a total thermal discomfort value ($\Sigma_B \Gamma_x$) of occupants thereof is minimum, wherein the total thermal discomfort value ($\Sigma_B \Gamma_x$) of occupants is a sum of a thermal discomfort value ($\Gamma_x$) of occupants for each building (x) of the at least some of the plurality of buildings and (ii) a sum of energy reduction value ($\Sigma_B R_x$) thereof and the initial demand energy reduction value ($R_D^{(n)}$) of the DCP is greater than or equal to the total target energy reduction value ($R_T$); (c) identify a temperature set point ($T_{SP}$) and a lighting intensity factor ($L_f$) for each building (x) of the at least some of the plurality of buildings based on an associated energy reduction value ($R_x$) using a look-up table and by using an inverse mapping technique; (d) extract a cooling load ($Q_x(t)$) for each building (x) of the at least some of the plurality of buildings and a chilled water mass flow rate ($m_x(t)$) thereof based on an associated temperature set point ($T_{SP}$) and an associated lighting intensity factor ($L_f$), using a British Thermal Units (BTU) meter installed in a corresponding building; (e) calculate a cooling load ($Q_D(t)$) of the DCP and a chilled water mass flowrate ($m_D(t)$) of the DCP by summing cooling loads and chilled water mass flow rates of each building (x) of the at least some of the plurality of buildings respectively; (f) estimate an intermediate energy reduction value ($R_D^{(*)}$) of the DCP based on the cooling load ($Q_D(t)$) of the DCP and the chilled water mass flowrate ($m_D(t)$) of the DCP using a chiller performance curve and a pump performance curve of the DCP; (g) determine a new demand energy reduction value ($R_D^{(n+1)}$) of the DCP based on the initial demand energy reduction value ($R_D^{(n)}$), the intermediate energy reduction value ($R_D^{(*)}$) and a relaxation parameter β; (h) iteratively perform steps (a) through (g) by taking the new demand energy reduction value ($R_D^{(n+1)}$) of the DCP as the initial demand energy reduction value ($R_D^{(n)}$) of the DCP until a condition $|R_D^{(n+1)} - R_D^{(n)}| < \varepsilon$ is satisfied, where a value of ε is 0.001; (i) capture the associated temperature set point ($T_{SP}$) and the associated lighting intensity factor ($L_f$) for each building (x) of the at least some of the plurality of buildings along with the total thermal discomfort value ($\Sigma_B \Gamma_x$) of occupants thereof and a peak power value ($P_W^{DR}$) during the DR event, for the initial supply chilled water temperature value ($T_s$) of the DCP; (j) iteratively perform steps (a) through (i) for remaining supply chilled water temperature values ($T_s$) of the DCP from the predefined range and capture the associated temperature set point ($T_{SP}$) and the associated lighting intensity factor ($L_f$) for each building (x) of the at least some of the plurality of buildings along with an associated total thermal discomfort value ($\Sigma_B \Gamma_x$) of occupants thereof and an associated peak power value ($P_W^{DR}$) during the DR event, for each of the remaining supply chilled water temperature values ($T_s$); and (k) identify the associated temperature set point ($T_{SP}$) and the associated lighting intensity factor ($L_f$) for each building (x) of the at least some of the plurality of buildings for an associated supply chilled water temperature value ($T_s$) as optimal decision parameters in the event that an associated total thermal discomfort value ($\Sigma_B \Gamma_x$) of occupants thereof is minimum and a snapback condition is satisfied, wherein the snapback condition occurs when the associated peak power value ($P_W^{DR}$) during the DR event is less than or equal to a peak power value ($\overline{P_W^{DR}}$) during a non DR event.

In an embodiment of the present disclosure, the predefined range of the supply chilled water temperature value ($T_s$) of the DCP varies from 4° C. to 12° C.

In an embodiment of the present disclosure, the thermal discomfort value ($\Gamma_x$) of occupants for each building (x) of the at least some of the plurality of buildings is calculated based on a count of occupants in the corresponding building, a total percentage of people dissatisfied (PPD) of the corresponding building and the total time duration (T) of the DR event.

In an embodiment of the present disclosure, the total PPD of the corresponding building is measured based on a room air temperature of the corresponding building, a room mean radiant temperature of the corresponding building, a room air humidity of the corresponding building, a room local air velocity of the corresponding building, metabolic rate of the occupants present in the corresponding building and a clothing insulation of the occupants present in the corresponding building.

In an embodiment of the present disclosure, the peak power value ($P_W^{DR}$) during the DR event is calculated based on the cooling load ($Q_x(t)$) for each building (x) of the at least some of the plurality of buildings and the chilled water mass flow rate ($m_x(t)$) thereof, the cooling load ($Q_D(t)$) of the DCP and the chilled water mass flowrate ($m_D(t)$) of the DCP, during the DR event.

In an embodiment of the present disclosure, the peak power value ($\overline{P_W^{DR}}$) during the non DR event is calculated based on the cooling load ($Q_x(t)$) for each building (x) of the at least some of the plurality of buildings and the chilled water mass flow rate ($m_x(t)$) thereof, the cooling load ($Q_D(t)$) of the DCP and the chilled water mass flowrate ($m_D(t)$) of the DCP, during the non DR event.

In an embodiment of the present disclosure, the new demand energy reduction value ($R_D^{(n+1)}$) of the DCP is determined according to a relation:

$$R_D^{(n+1)} = R_D^{(n)} + \beta \cdot (R_D^{(*)} - R_D^{(n)}),$$

where β is under relaxation parameter.

It is to be understood that both the foregoing general description and the following detailed description are exemplary and explanatory only and are not restrictive of the embodiments of the present disclosure, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
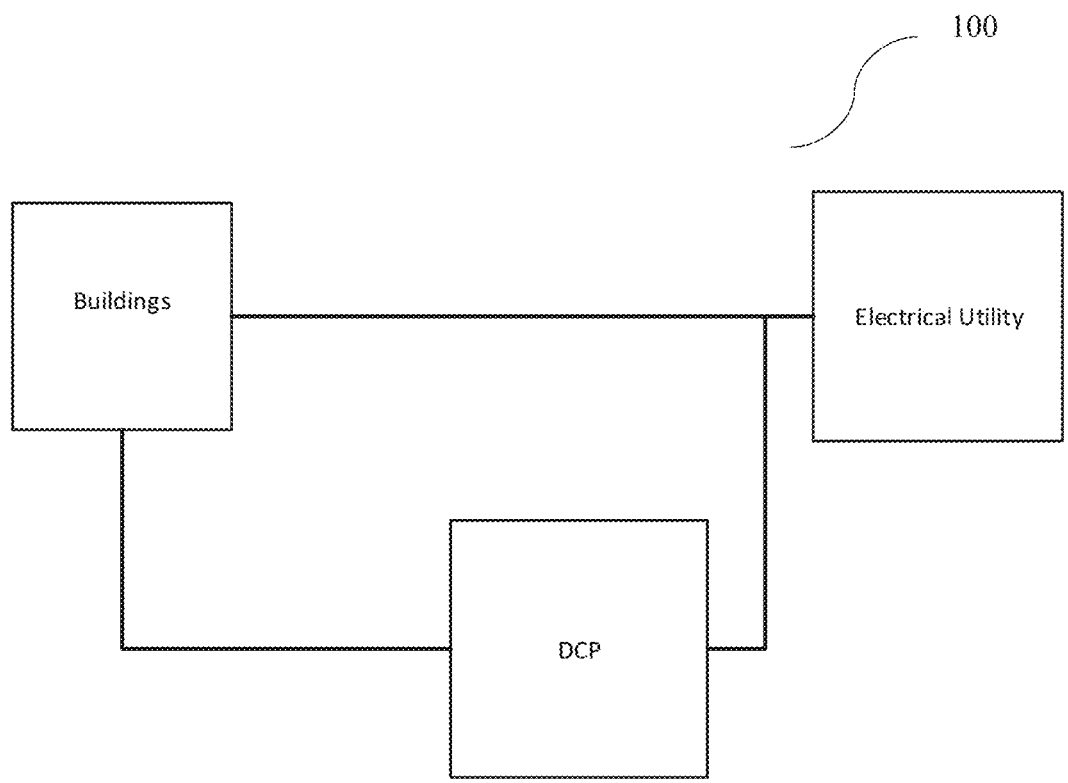
FIG. 1 is an exemplary block diagram showing an architecture comprising a plurality of buildings, the District Cooling Plant and a plurality of electrical utilities, in accordance with an embodiment of the present disclosure

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Terminologies like power and energy are interchangeably used depending on the context, which represents the power generated by the electrical utility or consumed either by the plurality of buildings or by the DCP or both. Decision variables and parameters are interchangeably used depending on the context, which represents key parameters of the DR participants. Similarly people and occupants are the humans who may present in the building during the DR event.

Demand response (DR) is used by electrical utilities to manage temporary supply-demand mismatches with participants (called as DR participants) such as buildings typically make independent decisions to reduce load. In conventional DR events, buildings mostly control loads of Heating, Ventilation and Air-conditioning (HVAC) units with pre-defined temperature set point and lighting units with pre-defined lighting intensity to minimize occupant discomfort while meeting a target demand energy reduction or vice-versa. More importantly, decision variables of one building i.e., the temperature set point and the lighting intensity is independent of the decision variables of other buildings i.e., respective temperature set point and respective lighting intensity, that may participate in the same DR event. However, there may be scenarios where the decision variables of DR participants get coupled instead of being independent. Specifically, when a District Cooling Plant (DCP) is involved to serve a plurality of buildings, then the decision variables of DR participants may not be independent as an electrically operated DCP also is a major electricity consumer of an electrical utility that supplies electrical power.

Thus, the plurality of buildings and the DCP are key DR participants of the electrical utility when the DCP is connected to the buildings during the DR event. The decision variables of the DR participants, such as temperature set point of HVAC units of each building, a lighting intensity factor of lighting units of each building and a supply chilled water temperature of the DCP are key parameters for achieving maximum possible target demand energy reduction during the DR event.

But, determining optimal values for the decision variables through conventional approaches is challenging due to: (i) a thermal discomfort experienced by occupants of building is a non-linear function of the temperature set point of the building, hence an objective function of sum of thermal discomfort of occupants in all the buildings is a non-linear function of the temperature set points of the corresponding buildings and (ii) a cooling load of the building is a non-linear function of the temperature set point of the building, ambient light intensity factor of the building and the chilled supply water temperature of the DCP. Hence, solving non-linear objective functions with non-linear coupled constraints at scale is challenging if not infeasible. Also, the conventional approaches did not scale beyond 12 number of buildings. Thus if hundreds of buildings are participated in the DR event for the load management, then it may become technically challenging to determine the optimal values for respective decision parameters of the buildings due to the non-linearity and by minimizing the thermal comfort of occupants of the buildings and by minimizing snapback effect while achieving the target demand energy reduction.

In accordance with the present disclosure, a system and a method for determining optimal decision parameters for the DR event is achieved through an optimized search strategy using domain knowledge, based on the decision variables involving the DCP alone: the optimal supply chilled water temperature value ($T_s$) and demand energy reduction value ($R_D$). The optimal decision parameters of each building and the DCP are determined by minimizing the thermal discomfort of the occupants in the buildings during the DR event such that: (i) the DCP and the buildings together meet the overall target demand energy reduction and (ii) do not create a snapback effect (new non-DR peak), while obeying non-linear objective functions and constraints with significant number of buildings.

In an embodiment of the present disclosure, an electrical utility is configured to directly control the loads of enrolled DR participants by assuming that the DCP and the plurality of the buildings served by the DCP are enrolled in an electrical utility's direct load control DR event. Thus the optimal decision parameters i.e. the temperature set point ($T_{SP}$) and the lighting intensity factor ($L_f$) of each building and the supply chilled water temperature value ($T_s$) of the DCP are determined with the disclosed optimized search strategy.

Referring now to the drawings, and more particularly to FIG. 1 through FIG. 5, where similar reference characters denote corresponding features consistently throughout the figures, there are shown preferred embodiments and these embodiments are described in the context of the following exemplary system and method for determining optimal decision parameters for the demand response (DR) event involving the District Cooling Plant.

FIG. 1 is an exemplary block diagram showing an architecture comprising a plurality of buildings (referred to as 'buildings' henceforth), the District Cooling Plant and a plurality of electrical utilities, in accordance with an embodiment of the present disclosure. A corresponding electrical utility from the plurality of electrical utilities may be connected actively at a time to the DCP and the plurality of buildings to serve the energy required for the facilities comprised therein. The DCP is configured to serve at least some of the buildings. Main components of the DCP are electrically operated centralized chiller units and a distribution network. The electrically operated centralized chiller unit extracts heat from warm return water of the buildings and supplies chilled water at a predetermined temperature set point and a flow rate. This is achieved through a combination of an evaporator, refrigeration and condenser units. The distribution network supplies chilled water through insulated pipes to the buildings and returns the warm water to the DCP.

In the buildings, with help of an end-consumer unit (also known as intake or sub-stations), a passive heat exchange (i.e., no mixing) between the chilled water supplied by the DCP and building side water is performed. The heat exchange is usually achieved through a plate heat exchanger. The cooled building water flows through cooling coils of a plurality of fan coil units (FCUs) or that of a plurality of air-handling units (AHUs) in the buildings. These FCUs/AHUs move heat from the warm air inside the building to the building's cooled water, which in turn passes the heat to the chilled water of the DCP.

In an embodiment, for pedagogical ease, the DCP is modelled with a single electrically operated centralized chiller unit. The DCP with electrically operated centralized chiller units may be handled by suitable sequencing routines. Each building is modelled by an intake station with one pump each on the building and primary side and one AHU with a supply fan.

Generally, the DCP and the buildings have a contractual agreement on the supply and return water temperatures to be maintained by the DCP and the buildings. Under normal operating conditions, the DCP must supply chilled water at 5° C.±1° C. (for example) temperature to the buildings. The buildings must ensure a return water temperature of 14° C. (for example). The building's indoor comfort temperature set point is controlled by the AHU supply fan. Normally, the performance of AHU cooling coil and plate heat exchanger at the intake station are affected by the chilled water supply temperature.

The cooling load ($Q_x(t)$) of building x at time t is a function of the building indoor comfort temperature set point ($T_{SP}$) and the lighting intensity factor ($L_f$) and heat sources such as occupants and plug loads. At the building intake stations, the chilled water mass flow rate on the primary side and the building side are functions of ($Q_x(t)$) and respective supply chilled water temperatures which may be same with ideal heat exchange at the intake station. Similarly, the chilled water mass flow rate on the primary side and the building side may also be the same for same reason. Thus a cooling load ($Q_D(t)$) of DCP at time t is sum of cooling loads of all the buildings. Similarly a chilled water mass flowrate ($m_D(t)$) at the DCP is sum of chilled water mass flow rates of all the buildings.

Figure 2:
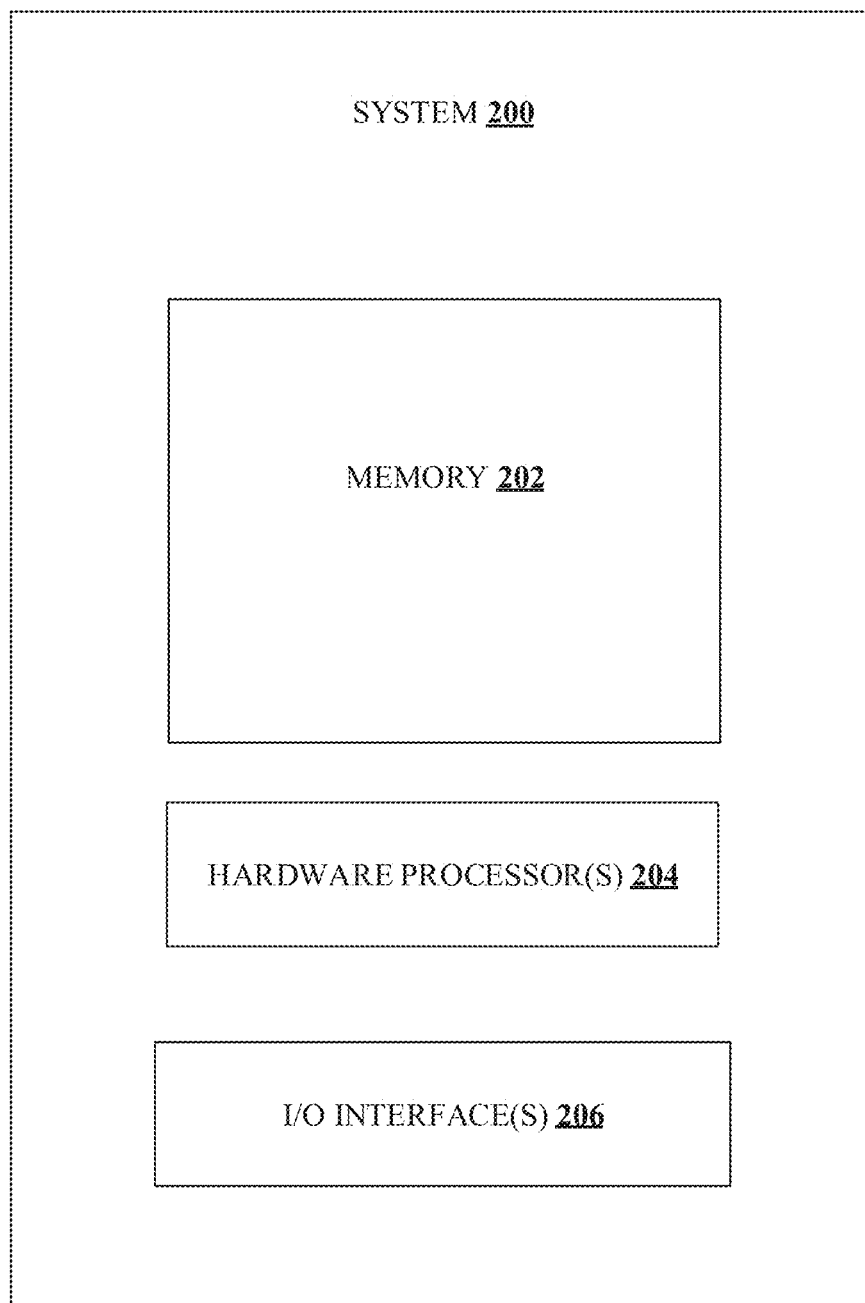
FIG. 2 illustrates an exemplary block diagram of a system for determining optimal decision parameters for a demand response (DR) event involving a District Cooling Plant, in accordance with an embodiment of the present disclosure.

FIG. 2 illustrates an exemplary block diagram of a system 200 for determining optimal decision parameters for the demand response (DR) event involving the District Cooling Plant (DCP), in accordance with an embodiment of the present disclosure. In an embodiment, the system 200 may be present in each electrical utility of FIG. 1, for performing the DR event in a direct load control technique at times of anticipated shortage in power supply of a corresponding electrical utility. In an embodiment, the system 200 includes one or more processors 204, communication interface device(s) or input/output (I/O) interface(s) 206, and one or more data storage devices or memory 202 operatively coupled to the one or more processors 204. The one or more processors 204 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) is configured to fetch and execute computer-readable instructions stored in the memory. In an embodiment, the system 200 can be implemented in a variety of computing systems, such as laptop computers, notebooks, hand-held devices, workstations, mainframe computers, servers, a network cloud and the like.

The I/O interface device(s) 206 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 202 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Figure 3A:
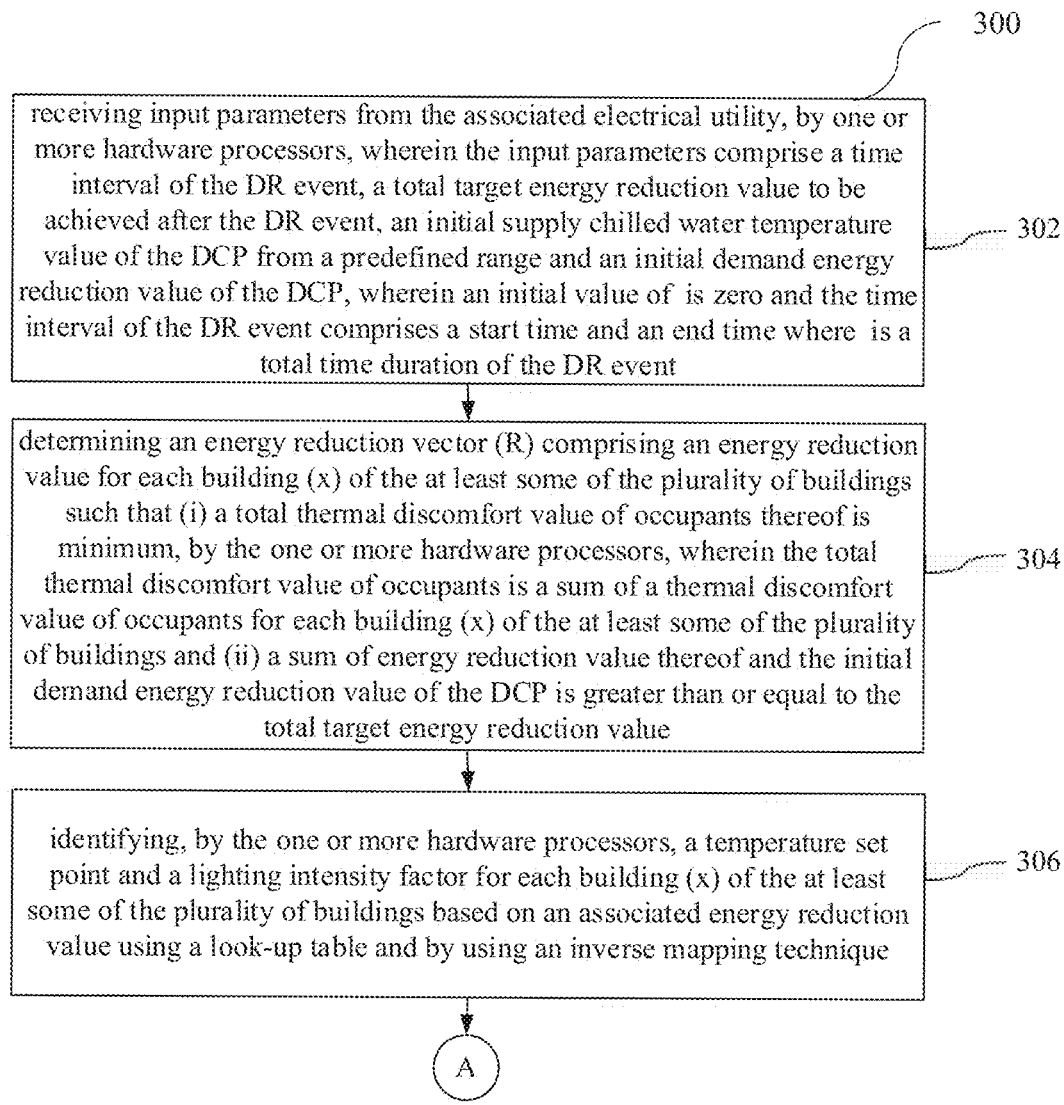
FIG. 3A through FIG. 3D illustrates a flow diagram of a processor implemented method for determining optimal decision parameters for a demand response (DR) event involving a District Cooling Plant, in accordance with an embodiment of the present disclosure.
Figure 3B:
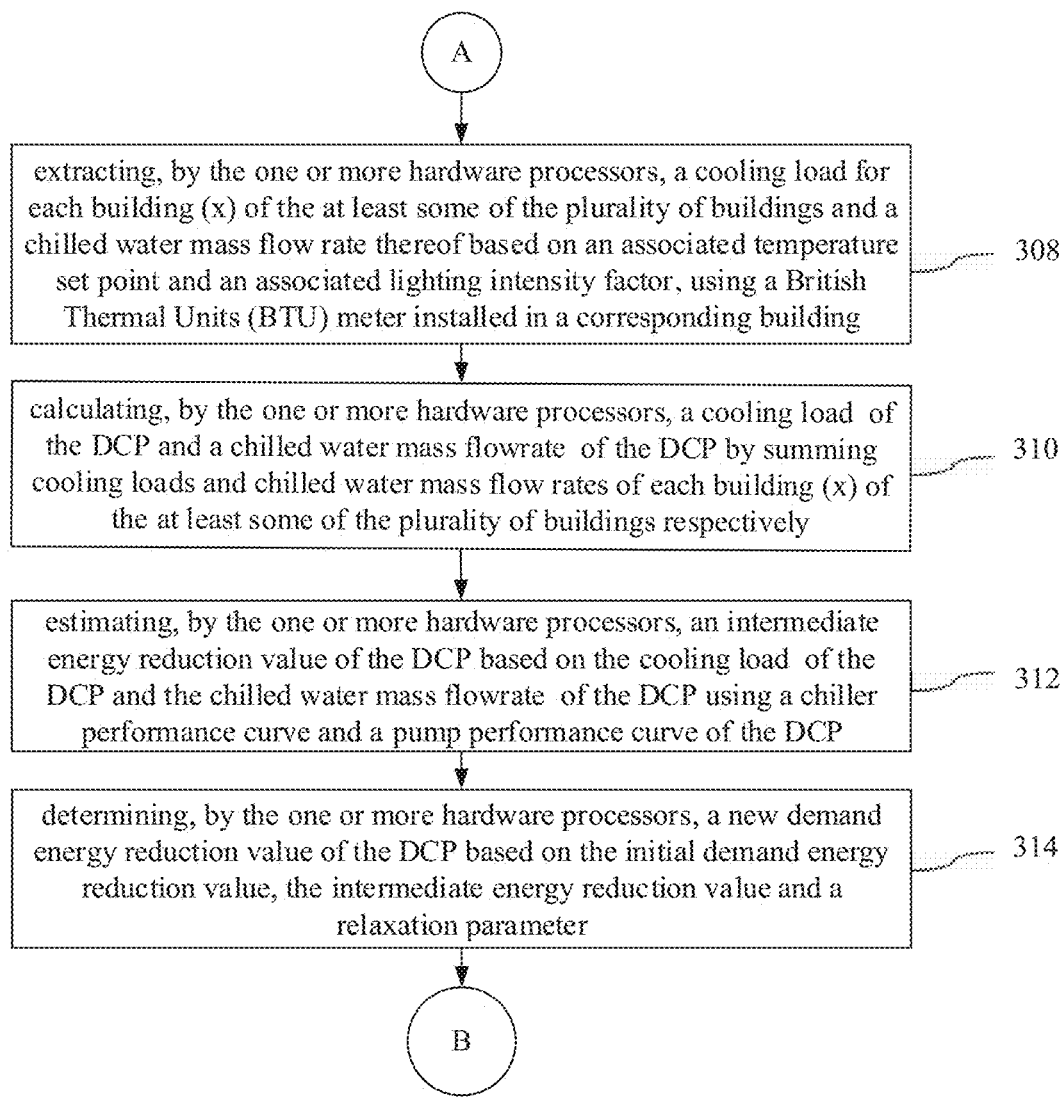
Figure 3C:
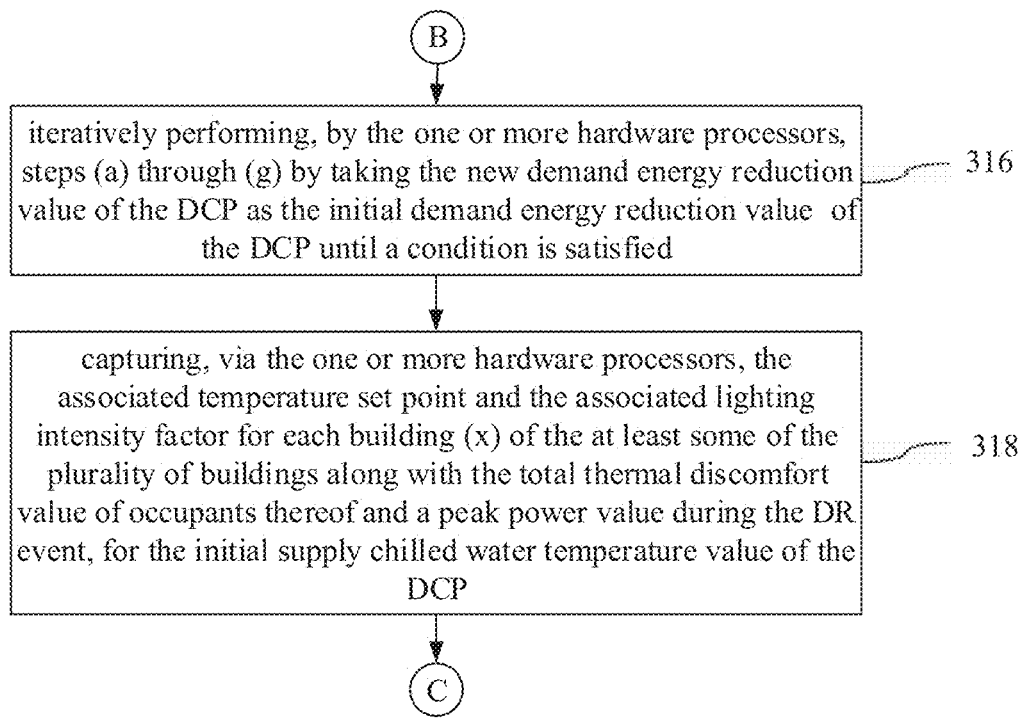
Figure 3D:
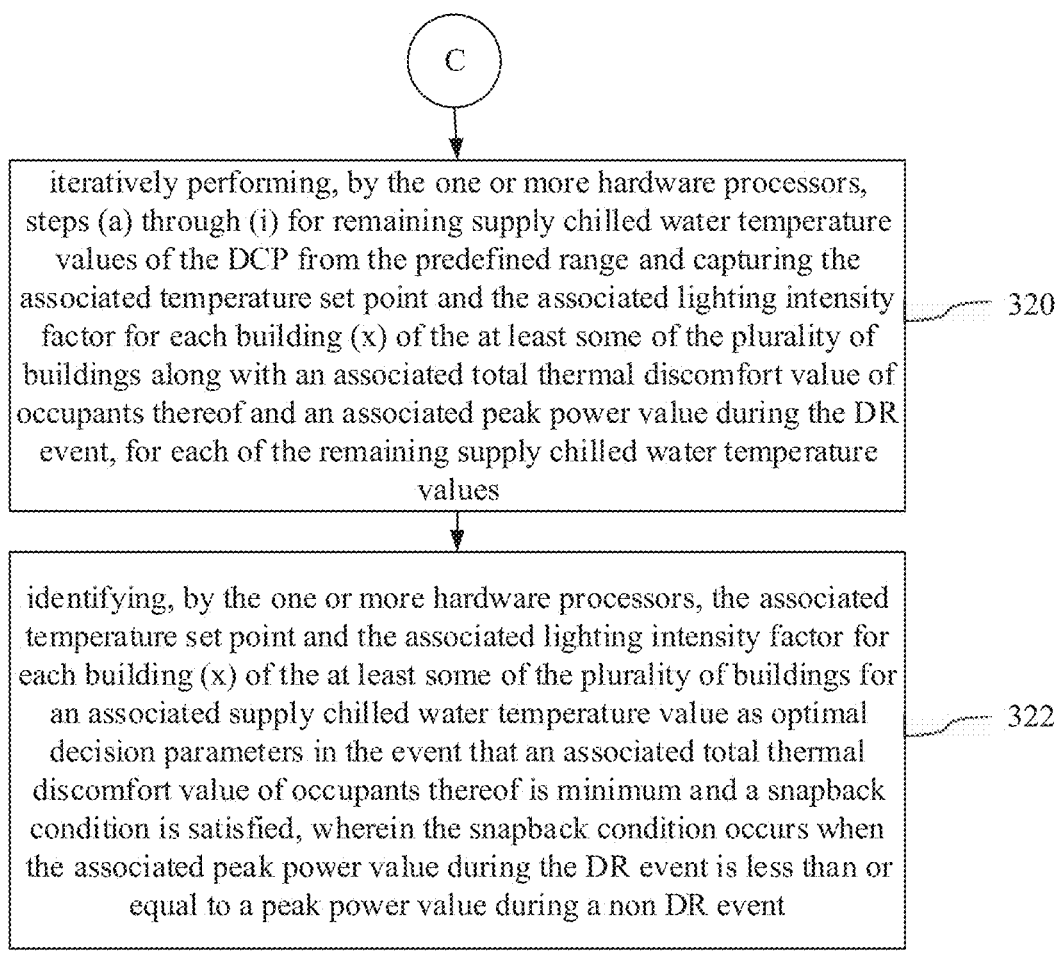

FIG. 3A through FIG. 3C illustrates a flow diagram of a computer implemented method 300 for determining optimal decision parameters for a demand response (DR) event involving a District Cooling Plant (DCP), in accordance with an embodiment of the present disclosure. In an embodiment, the one or more data storage devices or memory 202 operatively coupled to the one or more processors 204 is configured to store instructions configured for execution of steps of the method 300 by the one or more processors 204. The steps of the method 300 will now be explained in detail with reference to the exemplary architecture 100 of FIG. 1 and the components of the system 200 of FIG. 2. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

In accordance with an embodiment of the present disclosure, the one or more hardware processors 204 are configured to receive, at step 302, input parameters, from the associated electrical utility, wherein the input parameters comprises a time interval of the DR event, a total target energy reduction value ($R_T$) to be achieved after the DR event, an initial supply chilled water temperature value ($T_s$) of the DCP from a predefined range and an initial demand energy reduction value ($R_D$) of the DCP. An initial value of n is zero and the time interval of the DR event comprises a start time (t) and an end time (t+T) where T is a total time duration of the DR event.

In an embodiment, the associated electrical utility is configured to send a DR event signal to the plurality of the buildings and the DCP, upon identifying an event of energy shortage or load imbalance in order to serve the plurality of buildings and the DCP. The associated electrical utility upon receiving the confirmation from at least some of the plurality of buildings and the DCP to participate in the DR event, send the time interval of the DR event with the a start time (t) and an end time (t+T) where T is a total time duration of the DR event. The total target energy reduction value ($R_T$) is the total target energy reduction value that is to be achieved by the at least some of the plurality of buildings and the DCP after the DR event.

In an embodiment, the predefined range of the supply chilled water temperature value ($T_s$) of the DCP varies depend on a geographic location, environmental conditions and ambient requirements of the at least some of the plurality of buildings. In an embodiment, the system 200 is configured to receive the predefined range of the supply chilled water temperature value ($T_s$) of the DCP, from 4° C. to 12° C. The initial supply chilled water temperature value ($T_s$) is 4° C. and next supply chilled water temperature values ($T_s$) are obtained by incrementing with 0.5° C. (i.e. 4.5° C., 5° C., 5.5° C., 6° C. . . . ) until the final supply chilled water temperature values ($T_s$) of 12° C. is reached. The initial demand energy reduction value ($R_D^{(n)}$) of the DCP is set by the associated electrical utility to overcome the non-linear objective functions and constraints.

In an embodiment, each of the at least some of the plurality of buildings and the DCP comprises one or more power consuming units. The one or more power consuming units may include heating, ventilation, air condition (HVAC) units, lighting units, electrical plugs, and the like.

In accordance with an embodiment of the present disclosure, the one or more hardware processors 204 are configured to determine, at step 304, an energy reduction vector (R) comprising an energy reduction value ($R_x$) for each building (x) of the at least some of the plurality of buildings such that (i) a total thermal discomfort value ($\Sigma_B \Gamma_x$) of occupants thereof is minimum (equation 1) and (ii) a sum of energy reduction value ($\Sigma_B R_x$) thereof and the initial demand energy reduction value ($R_D^{(n)}$) of the DCP is at least greater or equal to the total target energy reduction value ($R_T$) (equation 2);

$$\text{Min}(R_B) \Sigma_B \Gamma_x(R_x) \quad (1)$$

$$\Sigma_B R_x + R_D^{(n)} \geq R_T \quad (2)$$

wherein B refer to the total number of buildings participating in the DR event.

In an embodiment, the total thermal discomfort value ($\Sigma_B \Gamma_x$) of occupants is a sum of a thermal discomfort value ($\Gamma_x$) of occupants for each building (x) of the at least some of the plurality of buildings. The thermal discomfort value ($\Gamma_x$) of occupants for each building (x) of the at least some of the plurality of buildings is calculated based on a count of occupants in the corresponding building, a total percentage of people dissatisfied (PPD) of the corresponding building with the immediate surrounding conditions at any point in time and the total time duration (T) of the DR event as per the equation 3.

$$\Gamma_x = \Sigma_t^{Start^{end}} p_x(t) \cdot PPD_x(t) \cdot T \quad (3)$$

Where $t^{start}$ and $t^{end}$ are the start time and an end time of the DR event, $p_x(t)$ is the occupants count of corresponding building (x) at any point of time t during the DR event and $PPD_x(t)$ is the total percentage of people dissatisfied (PPD) of the corresponding building (x) at any point of time t during the DR event.

In an embodiment, wherein the total PPD ($PPD_x(t)$) of the corresponding building (x) is measured based on parameters such as a room air temperature of the corresponding building (x), a room mean radiant temperature of the corresponding building (x), a room air humidity of the corresponding building (x), a room local air velocity of the corresponding building (x), metabolic rate of the occupants present in the corresponding building (x) and a clothing insulation of the occupants present in the corresponding building (x). In an embodiment, the room air temperature, the room mean radiant temperature and the room air humidity of the corresponding building (x) are obtained by using appropriate measuring devices. The room local air velocity of the corresponding building (x) is fixed at 0.15 m/s. The metabolic rate of the occupants of the corresponding building (x) is set at 1.2 met per person for sedentary/desk work (=126 W/person). The clothing insulation of the occupants present in the corresponding building (x) is set at 0.5 Clo assuming a summer season.

In an embodiment, the sum of energy reduction value ($\Sigma_B R_x$) is calculated by summing the energy reduction value ($R_x$) for each building (x) of the at least some of the plurality of buildings.

In accordance with an embodiment of the present disclosure, the one or more hardware processors 204 are configured to identify, at step 306, a temperature set point ($T_{SP}$) and a lighting intensity factor ($L_f$) for each building (x) of the at least some of the plurality of buildings based on an associated energy reduction value ($R_x$) using a look-up table and by an inverse mapping technique. Below Table. 1 shows a sample look-up table consists of different temperature set points ($T_{SP}$) and lighting intensity factors ($L_f$) for different supply chilled water temperature values ($T_s$).

TABLE 1

| Run | Ts | Tsp | Lf | Total plant DR units | Utility DR units | LargeOffice DR HVAC units | RetailStripMall DR HVAC units | LargeOffice ManHours Discomfort | RetailStripMall ManHours Discomfort |
|---|---|---|---|---|---|---|---|---|---|
| 0 | 5 | 24 | 1 | 1249070.426 | 1250344.951 | 1016.460123 | 56.034685 | 28.97409997 | 19.22183428 |
| 1 | 5 | 24.5 | 1 | 1207495.498 | 1208546.719 | 806.0957419 | 43.095589 | 34.41090782 | 20.88996515 |
| 2 | 5 | 25 | 1 | 1170784.127 | 1171666.96 | 647.1021235 | 33.700111 | 43.75852886 | 25.29173226 |
| 3 | 5 | 25.5 | 1 | 1137575.717 | 1138328.179 | 523.7362855 | 26.696021 | 57.21598013 | 32.58445106 |
| 4 | 5 | 26 | 0.8 | 1098415.177 | 1099006.406 | 407.6178039 | 19.728149 | 73.04238868 | 41.26701952 |
| 5 | 5.5 | 24 | 1 | 1180680.765 | 1181982.252 | 1041.797095 | 57.660337 | 29.01580853 | 19.22764214 |
| 6 | 5.5 | 24.5 | 0.8 | 1131990.102 | 1132986.863 | 791.6755491 | 41.202644 | 33.83167264 | 20.51303608 |
| 7 | 5.5 | 25 | 0.8 | 1098115.538 | 10989464.188 | 634.6339138 | 32.132475 | 42.84662532 | 24.55059362 |

TABLE 1-continued

| Run | Ts | Tsp | Lf | Total plant DR units | Utility DR units | LargeOffice DR HVAC units | RetailStripMall DR HVAC units | LargeOffice ManHours Discomfort | RetailStripMall ManHours Discomfort |
|---|---|---|---|---|---|---|---|---|---|
| 8 | 5.5 | 25.5 | 1 | 1075865.701 | 1076631.315 | 536.0948317 | 27.489202 | 57.39275506 | 32.64778215 |
| 9 | 5.5 | 26 | 1 | 1047150.861 | 1047811.656 | 436.6483634 | 22.116259 | 75.0856672 | 42.99460354 |
| 10 | 6 | 24 | 0.8 | 1114087.567 | 1115333.627 | 1026.611921 | 55.565525 | 28.74323113 | 19.20377169 |
| 11 | 6 | 24.5 | 0.8 | 1077674.521 | 1078693.569 | 812.5740906 | 42.591135 | 33.91520873 | 29.53255109 |
| 12 | 6 | 25 | 1 | 1054002.309 | 1054919.938 | 679.740921 | 35.85817 | 44.02392714 | 25.37628782 |
| 13 | 6 | 25.5 | 1 | 1024510.837 | 1025290.965 | 549.7285621 | 28.36965 | 57.5719804 | 32.70666294 |
| 14 | 6 | 26 | 1 | 997375.6097 | 998048.0519 | 447.5954102 | 22.816847 | 75.31006539 | 43.07051626 |

In an embodiment, the look-up table comprises various temperature set point ($T_{SP}$) values, various lighting intensity factor ($L_f$) values, associated energy reduction values and the thermal discomfort values ($\Gamma_x$) of occupants for each building (x) of the at least some of the plurality of buildings.

In accordance with an embodiment of the present disclosure, the one or more hardware processors 204 are configured to extract, at step 308, a cooling load ($Q_x(t)$) for each building (x) of the at least some of the plurality of buildings and a chilled water mass flow rate ($m_x(t)$) thereof based on an associated temperature set point ($T_{SP}$) and an associated lighting intensity factor ($L_f$), using a British Thermal Unit (BTU) meter installed in a corresponding building.

In an embodiment, the British Thermal Unit (BTU) meters are installed in each of the plurality of the buildings that measure of the energy based on an energy consumption of the corresponding building due to the associated temperature set point ($T_{SP}$) and an associated lighting intensity factor ($L_f$).

In accordance with an embodiment of the present disclosure, the one or more processors 204 are configured to calculate, at step 310, a cooling load ($Q_D(t)$) of the DCP and a chilled water mass flowrate ($m_D(t)$) of the DCP by summing cooling loads and chilled water mass flow rates of each building (x) of the at least some of the plurality of buildings respectively. The cooling load ($Q_D(t)$) of the DCP is calculated as per the equation 4 where $Q_i(t)$ refers to the cooling load of building x. Similarly, the chilled water mass flowrate ($m_D(t)$) of the DCP is calculated as per the equation 5 where $m_x(t)$ refers to the chilled water mass flow rate of building x $$Q_D(t) = \Sigma_B Q_x(t) \quad (4)$$

$$m_D(t) = \Sigma_B m_x(t) \quad (5)$$

In accordance with an embodiment of the present disclosure, the one or more hardware processors 204 are configured to estimate, at step 312, an intermediate energy reduction value ($R_D^{(*)}$) of the DCP based on the cooling load ($Q_D(t)$) of the DCP and the chilled water mass flowrate ($m_D(t)$) of the DCP using a chiller performance curve and a pump performance curve of the DCP. The intermediate energy reduction value ($R_D^{(*)}$) of the DCP is estimated due to the changes in the cooling load ($Q_D(t)$) of the DCP and the chilled water mass flowrate ($m_D(t)$) of the DCP.

In an embodiment, the chiller performance curve and a pump performance curve of the DCP are provided by the manufacturer of the DCP and along with associated influencing parameters and instructions while operating the DCP.

In accordance with an embodiment of the present disclosure, the one or more hardware processors 204 are configured to determine, at step 314, a new demand energy reduction value ($R_D^{(n+1)}$) of the DCP based on the initial demand energy reduction value ($R_D^{(n)}$), the intermediate energy reduction value ($R_D^{(*)}$) and a relaxation parameter $\beta$ as per the equation 6.

$$R_D^{(n+1)} = R_D^{(n)} + \beta \cdot (R_D^{(*)} - R_D^{(n)}) \quad (6)$$

where $\beta$ is the under relaxation parameter and is empirically found
that the value of $\beta$ is 0.1 to ensure both convergence and stability.

In accordance with an embodiment of the present disclosure, the one or more hardware processors 204 are configured to iteratively perform, at step 316, steps (302) through (314) by taking the new demand energy reduction value ($R_D^{(n+1)}$) of the DCP as the initial demand energy reduction value ($R_D^{(n)}$) of the DCP until a condition $|R_D^{(n+1)} - R_D^{(n)}| < \varepsilon$ is satisfied, where a value of $\varepsilon$ is 0.001.

In an embodiment, the value of n is incremented by 1 iteratively until a value of $|R_D^{(n+1)} - R_D^{(n)}|$ is less than 0.001.

In accordance with an embodiment of the present disclosure, the one or more hardware processors 204 are configured to capture, at step 318, the associated temperature set point ($T_{SP}$) and the associated lighting intensity factor ($L_f$) for each building (x) of the at least some of the plurality of buildings along with the total thermal discomfort value ($\Sigma_B \Gamma_x$) of occupants thereof and a peak power value ($P_W^{DR}$) during the DR event, for the initial supply chilled water temperature value ($T_s$) of the DCP.

In an embodiment, the peak power value ($P_W^{DR}$) during the DR event is calculated based on the cooling load ($Q_x(t)$) for each building (x) of the at least some of the plurality of buildings and the chilled water mass flow rate ($m_x(t)$) thereof, the cooling load ($Q_D(t)$) of the DCP and the chilled water mass flowrate ($m_D(t)$) of the DCP, during the DR event.

In an embodiment, the peak power value ($P_W^{DR}$) during the DR event is calculated to validate the snap back effect which refers to an energy demand increase immediately after the DR event when the DR participants return the optimal decision parameters to their normal operating points. The DCP may consume a significant portion of the overall electrical utility energy for this reason. Hence, while bringing the DR participants and the DCP back to normal operating points immediately post the DR event may create a new peak power point, which may be more than that of baseline peak power value which is to be reduced. So, the DR participants return to normal operating points is usually staggered. This may also increase the duration over which the occupants feel uncomfortable. In an embodiment, the snapback effect is reduced by delaying the return of chilled water set point at the DCP to its normal operating point of 5° C. by one hour. However, the buildings are returned to their normal operating point of ($T_{SP}$)=24° C. immediately post the DR event. There may be increase in the energy consumption for the buildings compared with baseline.

In accordance with an embodiment of the present disclosure, the one or more hardware processors 204 are configured to iteratively perform, at step 320, steps (302) through (318) for remaining supply chilled water temperature values ($T_s$) of the DCP from the predefined range and capturing the associated temperature set point ($T_{SP}$) and the associated lighting intensity factor ($L_f$) for each building (x) of the at least some of the plurality of buildings along with an associated total thermal discomfort value ($\Sigma_B \Gamma_x$) of occupants thereof and an associated peak power value ($P_W^{DR}$) during the DR event, for each of the remaining supply chilled water temperature values ($T_s$).

In accordance with an embodiment of the present disclosure, the one or more hardware processors 204 are configured to identify, at step 322, the associated temperature set point ($T_{SP}$) and the associated lighting intensity factor ($L_f$) for each building (x) of the at least some of the plurality of buildings for an associated supply chilled water temperature value ($T_s$) as optimal decision parameters in the event that an associated total thermal discomfort value ($\Sigma_B \Gamma_x$) of occupants thereof is minimum and a snapback condition is satisfied. The snapback condition occurs when the associated peak power value ($P_W^{DR}$) during the DR event is less than or equal to a peak power value ($\overline{P_W^{DR}}$) during a non DR event.

In an embodiment, the peak power value ($\overline{P_W^{DR}}$) during the non DR event is calculated based on the cooling load ($Q_x(t)$) for each building (x) of the at least some of the plurality of buildings and the chilled water mass flow rate ($m_x(t)$) thereof, the cooling load ($Q_D(t)$) of the DCP and the chilled water mass flowrate ($m_D(t)$) of the DCP, during the non DR event. In an embodiment, the peak power value ($\overline{P_W^{DR}}$) during the non DR event refers to a maximum power value that is identified during the last two days before the DR event is scheduled.

Thus, the optimal decision parameters: the temperature set point ($T_{SP}$) and the lighting intensity factor ($L_f$) for each building (x) of the at least some of the plurality of buildings, and the supply chilled water temperature value ($T_s$) of the DCP are determined to achieve the maximum possible target demand energy reduction considering the thermal discomfort of occupants present in the buildings that are configured to participate in the DR event.

Experimental Results

The proposed system and method for determining optimal decision parameters for a demand response event involving a district cooling plant (DCP), is evaluated is evaluated on a realistic dataset consisting of 416 buildings with 6 different building types, considering a District Cooling (DC) provider in Dubai having the DCP that serves a peak cooling load of 1.2 million tons of refrigeration (TR), while the commissioned load is approximately 700 k TR. Different type of buildings such as large office buildings, malls, schools, hospitals, restaurants, and high-rise residential buildings are considered. For each building type, the only publicly available information that is total served area with no additional information on the number of buildings is considered. The building sizes for each building type are sampled from the distribution of the PLUTO data-set such that the total served area of each building type roughly matched with Dubai's data.

A co-simulation framework with Building Virtual Control Test Bed (BCVTB) and EnergyPlus™ building simulation tool is utilized for simulating the DCP network. BCVTB has been used to couple the EnergyPlus™ simulator for the DCP with EnergyPlus™ simulator for various building types and the electrical utility. The electrical utility is configured to send a DR event signal to the buildings and the DCP at times of anticipated shortage in supply. The DCP and buildings are connected through a chilled water distribution network. The DCP has access to the BTU meter situated for each building, while the electrical utility has access to the energy meters of the buildings and the DCP. The EnergyPlus™ building simulation tool takes into the account the building envelope properties, HVAC details, etc. and gives the temperature evolution and the associated energy consumption.

Figure 4A:
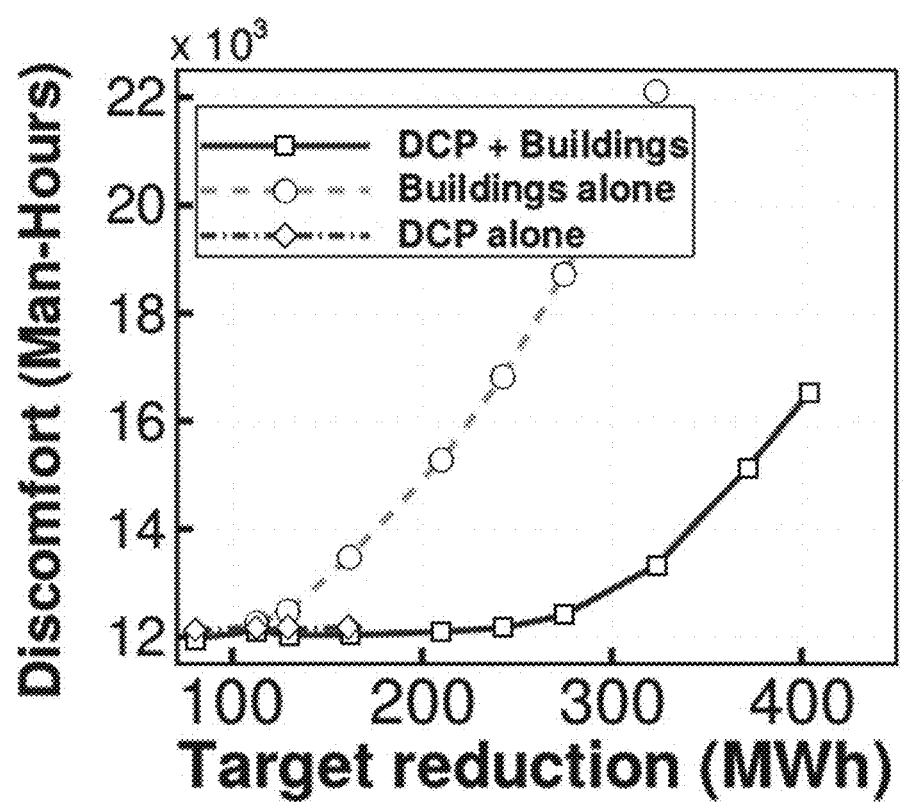
FIG. 4A is a graph showing a thermal discomfort as a function of target demand energy reduction for (i) the DCP alone (ii) the buildings alone and (iii) the buildings and the DCP together, in accordance with an embodiment of the present disclosure.

FIG. 4A is a graph showing a thermal discomfort as a function of the target energy demand reduction for: (i) the DCP alone (ii) the buildings alone and (iii) the buildings and the DCP together. It is observed that: (i) the DCP alone cannot meet the target reduction beyond 11% as from a truncated line (ii) when the buildings alone participate in the DR event, they can reduce up to 21% and the discomfort is observed as much higher and (iii) when the buildings and the DCP together participate in the DR event, the maximum demand reduction possible is 32% and the thermal discomfort is much lower (by an average of 25%) than when the buildings alone participate. It is concluded that the buildings and the DCP cannot independently participate in the DR event and need to coordinate.

Figure 4B:
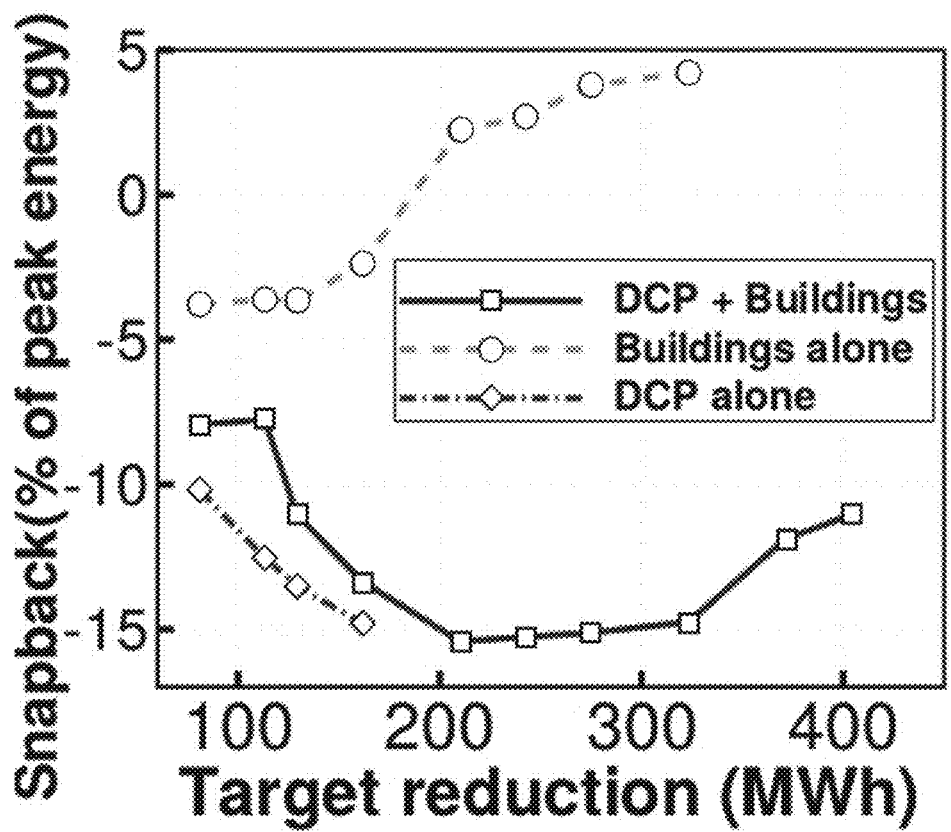
FIG. 4B is a graph showing a snapback effect for (i) the DCP alone (ii) the buildings alone and (iii) the buildings and the DCP together, in accordance with an embodiment of the present disclosure.
Figure 5:
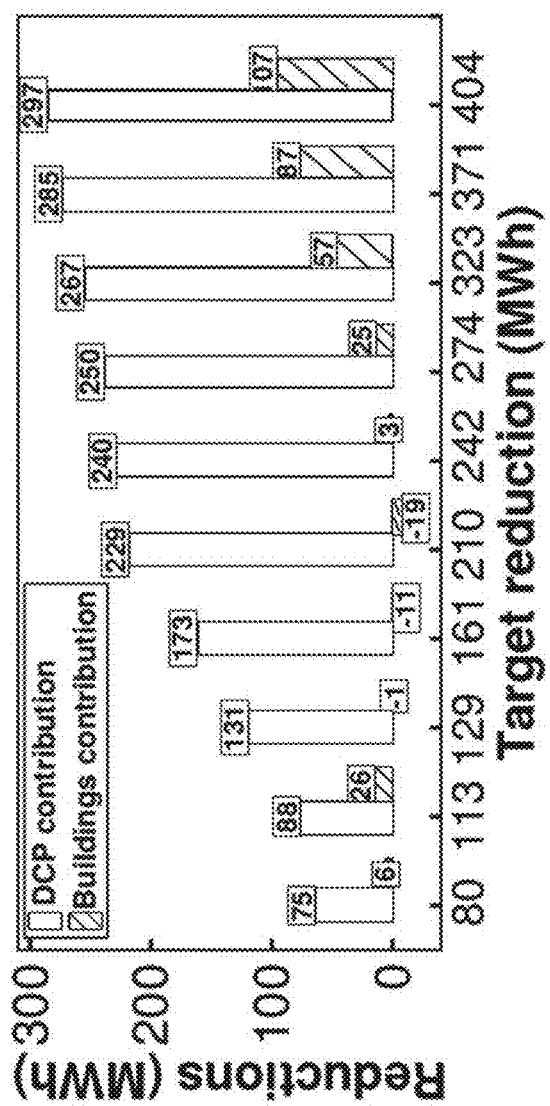
FIG. 5 is a graph showing a contribution of target demand energy reduction of the buildings and the DCP, when about 500 buildings are participated in the DR event.

FIG. 4B is a graph showing a snapback effect for (i) the DCP alone (ii) the buildings alone and (iii) the buildings and the DCP together, in accordance with an embodiment of the present disclosure. It is observed that the snapback effect is unacceptably higher when the buildings alone participate in the DR event. The snapback effect is acceptable when the DCP alone participates but the DCP cannot meet the target energy demand reduction beyond a threshold value. The snapback effect when both the buildings and the DCP participates shows a counter-intuitive behaviour. Specifically, the snapback effect first decreases with increasing target energy demand reduction and then increases. The reason for this behaviour may be explained with the break-up of the target energy demand reduction across the buildings and the DCP shown in FIG. 5 which is a graph showing a contribution of target demand energy reduction of the buildings and the DCP, when about 500 buildings are participated. It is observed that for a target energy demand reduction up to 15%, the savings are mostly contributed by the DCP by increasing the chilled supply water temperature value. Because contribution of the DCP to the DR event increases in this interval, but the contribution of the buildings reduces due to the fact that the buildings may increase fan speed and pump flow rate to meet thermal comfort of occupants present in the building. A load of the DCP comes back online in a staggered manner and does not contribute to the snapback effect. Thus the overall snapback effect falls as the target energy demand reduction increases. Once the target energy demand reduction reaches a critical value, further savings are no longer possible through the DCP alone. This causes the buildings to contribute more to the energy reduction and consequently the snapback effect.

In accordance with the present disclosure, the proposed system and method for determining optimal decision parameters for a demand response event involving a district cooling plant (DCP) determine the optimal decision parameters i.e. the temperature set point ($T_{SP}$) and the lighting intensity factor ($L_f$) of each building and the supply chilled water temperature value ($T_s$) of the DCP. The proposed system and method achieves the maximum possible overall target energy demand reduction while satisfying the thermal comfort of the occupants of all the buildings and by avoiding the peak power demand during the snapback effect considering the significant number of buildings (more than 416 buildings) participating in the DR event.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for determining optimal decision parameters for a Demand Response (DR) event involving a District Cooling Plant (DCP) serving at least some of a plurality of buildings, wherein the DCP and each of the at least some of the plurality of buildings are configured to participate with an associated electrical utility from a plurality of electrical utilities in the DR event, wherein each of the at least some of the plurality of buildings and the DCP comprises one or more power consuming units, the method comprising the steps of:

(a) receiving input parameters from the associated electrical utility, by one or more hardware processors, wherein the input parameters comprise a time interval of the DR event, a total target energy reduction value ($R_T$) to be achieved after the DR event, an initial supply chilled water temperature value ($T_S$) of the DCP from a predefined range and an initial demand energy reduction value ($R_D^{(n)}$) of the DCP, wherein an initial value of n is zero and the time interval of the DR event comprises a start time (t) and an end time (t+T) where T is a total time duration of the DR event;

(b) determining, by the one or more hardware processors, an energy reduction vector (R) comprising an energy reduction value ($R_x$) for each building (x) of the at least some of the plurality of buildings such that (i) a total thermal discomfort value ($\Sigma_B \Gamma_x$) of occupants thereof is minimum, wherein the total thermal discomfort value ($\Sigma_B \Gamma_x$) of occupants is a sum of a thermal discomfort value ($\Gamma_x$) of occupants for each building (x) of the at least some of the plurality of buildings and (ii) a sum of energy reduction value ($\Sigma_B R_x$) thereof and the initial demand energy reduction value ($R_D^{(n)}$) of the DCP is greater than or equal to the total target energy reduction value ($R_T$);

(c) identifying, by the one or more hardware processors, a temperature set point ($T_{SP}$) and a lighting intensity factor ($L_f$) for each building (x) of the at least some of the plurality of buildings based on an associated energy reduction value ($R_x$) using a look-up table and by using an inverse mapping technique;

(d) extracting, by the one or more hardware processors, a cooling load ($Q_x(t)$) for each building (x) of the at least some of the plurality of buildings and a chilled water mass flow rate($m_x(t)$) thereof based on an associated temperature set point ($T_{SP}$) and an associated lighting intensity factor ($L_f$), using a British Thermal Units (BTU) meter installed in a corresponding building;

(e) calculating, by the one or more hardware processors, a cooling load ($Q_D(t)$) of the DCP and a chilled water mass flowrate ($m_D(t)$) of the DCP by summing cooling loads and chilled water mass flow rates of each building (x) of the at least some of the plurality of buildings respectively;

(f) estimating, by the one or more hardware processors, an intermediate energy reduction value $(R_D^{(*)})$ of the DCP based on the cooling load $(Q_D(t))$ of the DCP and the chilled water mass flowrate $(m_D(t))$ of the DCP using a chiller performance curve and a pump performance curve of the DCP;

(g) determining, by the one or more hardware processors, a new demand energy reduction value $(R_D^{(n+1)})$ of the DCP based on the initial demand energy reduction value $(R_D^{(n)})$, the intermediate energy reduction value $(R_D^{(*)})$ and a relaxation parameter $\beta$;

(h) iteratively performing, by the one or more hardware processors, steps (a) through (g) by taking the new demand energy reduction value $(R_D^{(n+1)})$ of the DCP as the initial demand energy reduction value $(R_D^{(n)})$ of the DCP until a condition $|R_D^{(n+1)} - R_D^{(n)}| < \varepsilon$ satisfied, wherein a value of $\varepsilon$ is 0.001;

(i) capturing, via the one or more hardware processors, the associated temperature set point $(T_{SP})$ and the associated lighting intensity factor $(L_f)$ for each building (x) of the at least some of the plurality of buildings along with the total thermal discomfort value $(\Sigma_B \Gamma_x)$ of occupants thereof and a peak power value $(P_W^{DR})$ during the DR event, for the initial supply chilled water temperature value $(T_S)$ of the DCP;

(j) iteratively performing, by the one or more hardware processors, steps (a) through (i) for remaining supply chilled water temperature values $(T_S)$ of the DCP from the predefined range and capturing the associated temperature set point $(T_{SP})$ and the associated lighting intensity factor $(L_f)$ for each building (x) of the at least some of the plurality of buildings along with an associated total thermal discomfort value $(\Sigma_B \Gamma_x)$ of occupants thereof and an associated peak power value $(P_W^{DR})$ during the DR event, for each of the remaining supply chilled water temperature values $(T_S)$; and (k) identifying, by the one or more hardware processors, the associated temperature set point $(T_{SP})$ and the associated lighting intensity factor $(L_f)$ for each building (x) of the at least some of the plurality of buildings for an associated supply chilled water temperature value $(T_S)$ as optimal decision parameters in the event that an associated total thermal discomfort value $(\Sigma_B \Gamma_x)$ of occupants thereof is minimum and a snapback condition is satisfied, wherein the snapback occurs when the associated peak power value $(P_W^{DR})$ during the DR event is less than or equal to a peak power value $(P_W^{DR})$ during a non DR event.

2. The method of claim 1, wherein the predefined range of the supply chilled water temperature value $(T_s)$ of the DCP varies from 40° C. to 12° C.

3. The method of claim 1, wherein the thermal discomfort value $(\Gamma_x)$ of occupants for each building (x) of the at least some of the plurality of buildings is calculated based on a count of occupants in the corresponding building, a total percentage of people dissatisfied (PPD) of the corresponding building and the total time duration (T) of the DR event.

4. The method of claim 3, wherein the total PPD of the corresponding building is measured based on a room air temperature of the corresponding building, a room mean radiant temperature of the corresponding building, a room air humidity of the corresponding building, a room local air velocity of the corresponding building, metabolic rate of the occupants present in the corresponding building and a clothing insulation of the occupants present in the corresponding building.

5. The method of claim 1, wherein the peak power value $(P_W^{DR})$ during the DR event is calculated based on the cooling load $(Q_x(t))$ for each building (x) of the at least some of the plurality of buildings and the chilled water mass flow rate $(m_x(t))$ thereof, the cooling load $(Q_D(t))$ of the DCP and the chilled water mass flowrate $(m_D(t))$ of the DCP, during the DR event.

6. The method of claim 1, wherein the peak power value $(\overline{P_W^{DR}})$ during the non DR event is calculated based on the cooling load $(Q_x(t))$ for each building (x) of the at least some of the plurality of buildings and the chilled water mass flow rate $(m_x(t))$ thereof, the cooling load $(Q_D(t))$ of the DCP and the chilled water mass flowrate $(m_D(t))$ of the DCP, during the non DR event.

7. The method of claim 1, wherein the new demand energy reduction value $(R_D^{(n+1)})$ of the DCP is determined according to a relation:

$$R_D^{(n+1)} = R_D^{(n)} + \beta \cdot (R_D^{(*)} - R_D^{(n)}),$$

where $\beta$ is under relaxation parameter.

8. A system for determining optimal decision parameters for a demand response (DR) event involving a District Cooling Plant (DCP) serving at least some of a plurality of buildings, wherein the DCP and each of the at least some of the plurality of buildings are configured to participate with an associated electrical utility from a plurality of electrical utilities in the DR event, wherein each of the at least some of the plurality of buildings and the DCP comprises one or more power consuming units, the system comprising:

one or more data storage devices operatively coupled to one or more hardware processors and configured to store instructions which when executed cause the one or more hardware processors to:

(a) receive input parameters from the associated electrical utility, wherein the input parameters comprise a time interval of the DR event, a total target energy reduction value $(R_T)$ to be achieved after the DR event, an initial supply chilled water temperature value $(T_S)$ of the DCP from a predefined range and an initial demand energy reduction value $(R_D^{(n)})$ of the DCP, wherein an initial value of n is zero and the time interval of the DR event comprises a start time (t) and an end time (t+T) where T is a total time duration of the DR event;

(b) determine an energy reduction vector (R) comprising an energy reduction value $(R_x)$ for each building (x) of the at least some of the plurality of buildings such that (i) a total thermal discomfort value $((\Sigma_B \Gamma_x)$ of occupants thereof is minimum, wherein the total thermal discomfort value $(\Sigma_B \Gamma_x)$ of occupants is a sum of a thermal discomfort value $(\Gamma_x)$ of occupants for each building (x) of the at least some of the plurality of buildings and (ii) a sum of energy reduction value $(\Sigma_B \Gamma_x)$ thereof and the initial demand energy reduction value $(R_D^{(n)})$ of the DCP is greater than or equal to the total target energy reduction value $(R_T)$;

(c) identify a temperature set point $(T_{SP})$ and a lighting intensity factor $(L_f)$ for each building (x) of the at least some of the plurality of buildings based on an associated energy reduction value $(R_x)$ using a look-up table and by using an inverse mapping technique;

(d) extract a cooling load $(Q_x(t))$ for each building (x) of the at least some of the plurality of buildings and a chilled water mass flow rate $(m_x(t))$ thereof based on an associated temperature set point $(T_{SP})$ and an associated lighting intensity factor $(L_f)$, using a British Thermal Units (BTU) meter installed in a corresponding building;

(e) calculate a cooling load ($Q_D(t)$) of the DCP and a chilled water mass flowrate ($m_D(t)$) of the DCP by summing cooling loads and chilled water mass flow rates of each building (x) of the at least some of the plurality of buildings respectively;

(f) estimate an intermediate energy reduction value ($R_D^{(*)}$) of the DCP based on the cooling load ($Q_D(t)$) of the DCP and the chilled water mass flowrate ($m_D(t)$) of the DCP using a chiller performance curve and a pump performance curve of the DCP;

(g) determine a new demand energy reduction value ($R_D^{(n+1)}$) of the DCP based on the initial demand energy reduction value ($R_D^{(n)}$), the intermediate energy reduction value ($R_D^{(*)}$) and a relaxation parameter $\beta$;

(h) iteratively perform steps (a) through (g) by taking the new demand energy reduction value ($R_D^{(n+1)}$) of the DCP as the initial demand energy reduction value ($R_D^{(n+1)}$) of the DCP until a condition $|R_D^{(n+1)} - R_D^{(n)}| < \varepsilon$ satisfied, wherein a value of $\varepsilon$ is 0.001;

(i) capture the associated temperature set point ($T_{SP}$) and the associated lighting intensity factor ($L_f$) for each building (x) of the at least some of the plurality of buildings along with the total thermal discomfort value ($\Sigma_B \Gamma_x$) of occupants thereof and a peak power value ($P_W^{DR}$) during the DR event, for the initial supply chilled water temperature value ($T_S$) of the DCP;

(j) iteratively perform steps (a) through (i) for remaining supply chilled water temperature values ($T_S$) of the DCP from the predefined range and capturing the associated temperature set point ($T_{SP}$) and the associated lighting intensity factor ($L_f$) for each building (x) of the at least some of the plurality of buildings along with an associated total thermal discomfort value ($\Sigma_B \Gamma_x$) of occupants thereof and an associated peak power value ($P_W^{DR}$) during the DR event, for each of the remaining supply chilled water temperature values ($T_S$); and (k) identify the associated temperature set point ($T_{SP}$) and the associated lighting intensity factor ($L_f$) for each building (x) of the at least some of the plurality of buildings for an associated supply chilled water temperature value ($T_S$) as optimal decision parameters in the event that an associated total thermal discomfort value ($\Sigma_B \Gamma_x$) of occupants thereof is minimum and a snapback condition is satisfied, wherein the snapback occurs when the associated peak power value ($P_W^{DR}$) during the DR event is less than or equal to a peak power value ($\overline{P_W^{DR}}$) during a non DR event.

9. The system of claim 8, wherein the predefined range of the supply chilled water temperature value ($T_s$) of the DCP varies from 40° C. to 12° C.

10. The system of claim 8, wherein the thermal discomfort value ($\Gamma_x$) of occupants for each building (x) of the at least some of the plurality of buildings is calculated based on a count of occupants in the corresponding building, a total percentage of people dissatisfied (PPD) of the corresponding building and the total time duration (T) of the DR event.

11. The system of claim 10, wherein the total PPD of the corresponding building is measured based on a room air temperature of the corresponding building, a room mean radiant temperature of the corresponding building, a room air humidity of the corresponding building, a room local air velocity of the corresponding building, metabolic rate of the occupants present in the corresponding building and a clothing insulation of the occupants present in the corresponding building.

12. The system of claim 8, wherein the peak power value ($P_W^{DR}$) during the DR event is calculated based on the cooling load ($Q_x(t)$) for each building (x) of the at least some of the plurality of buildings and the chilled water mass flow rate ($m_x(t)$) thereof, the cooling load ($Q_D(t)$) of the DCP and the chilled water mass flowrate ($m_D(t)$) of the DCP, during the DR event.

13. The system of claim 8, wherein the peak power value ($\overline{P_W^{DR}}$) during the non DR event is calculated based on the cooling load ($Q_x(t)$) for each building (x) of the at least some of the plurality of buildings and the chilled water mass flow rate ($m_x(t)$) thereof, the cooling load ($Q_D(t)$) of the DCP and the chilled water mass flowrate ($m_D(t)$) of the DCP, during the non DR event.

14. The system of claim 8, wherein the new demand energy reduction value ($R_D^{(n+1)}$) of the DCP is determined according to a relation:

$$R_D^{(n+1)} = R_D^{(n)} + \beta \cdot (R_D^{(*)} - R_D^{(n)}),$$

where $\beta$ is under relaxation parameter.

15. A computer program product comprising a non-transitory computer readable medium having a computer readable program embodied therein, wherein the computer readable program, when executed on a computing device, causes the computing device to:

(a) receive input parameters from the associated electrical utility, wherein the input parameters comprise a time interval of the DR event, a total target energy reduction value ($R_T$) to be achieved after the DR event, an initial supply chilled water temperature value ($T_S$) of the DCP from a predefined range and an initial demand energy reduction value ($R_D^{(n)}$) of the DCP, wherein an initial value of n is zero and the time interval of the DR event comprises a start time (t) and an end time (t+T) where T is a total time duration of the DR event;

(b) determine an energy reduction vector (R) comprising an energy reduction value ($R_x$) for each building (x) of the at least some of the plurality of buildings such that (i) a total thermal discomfort value ($\Sigma_B \Gamma_x$) of occupants thereof is minimum, wherein the total thermal discomfort value ($\Sigma_B \Gamma_x$) of occupants is a sum of a thermal discomfort value ($\Gamma_x$) of occupants for each building (x) of the at least some of the plurality of buildings and (ii) a sum of energy reduction value ($\Sigma_B \Gamma_x$) thereof and the initial demand energy reduction value ($R_D^{(n)}$) of the DCP is greater than or equal to the total target energy reduction value ($R_T$);

(c) identify a temperature set point ($T_{SP}$) and a lighting intensity factor ($L_f$) for each building (x) of the at least some of the plurality of buildings based on an associated energy reduction value ($R_x$) using a look-up table and by using an inverse mapping technique;

(d) extract a cooling load ($Q_x(t)$) for each building (x) of the at least some of the plurality of buildings and a chilled water mass flow rate ($m_x(t)$) thereof based on an associated temperature set point ($T_{SP}$) and an associated lighting intensity factor ($L_f$), using a British Thermal Units (BTU) meter installed in a corresponding building;

(e) calculate a cooling load ($Q_D(t)$) of the DCP and a chilled water mass flowrate ($m_D(t)$) of the DCP by summing cooling loads and chilled water mass flow rates of each building (x) of the at least some of the plurality of buildings respectively;

(f) estimate an intermediate energy reduction value ($R_D^{(*)}$) of the DCP based on the cooling load ($Q_D(t)$) of the DCP and the chilled water mass flowrate ($m_D(t)$) of the DCP using a chiller performance curve and a pump performance curve of the DCP;

(g) determine a new demand energy reduction value ($R_D^{(n+1)}$) of the DCP based on the initial demand energy reduction value ($R_D^{(n)}$), the intermediate energy reduction value ($R_D^{(*)}$) and a relaxation parameter $\beta$;

(h) iteratively perform steps (a) through (g) by taking the new demand energy reduction value ($R_D^{(n+1)}$) of the DCP as the initial demand energy reduction value ($R_D^{(n)}$) of the DCP until a condition $|R_D^{(n+1)} - R_D^{(n)}| < \varepsilon$ satisfied, wherein a value of $\varepsilon$ is 0.001;

(i) capture the associated temperature set point ($T_{SP}$) and the associated lighting intensity factor ($L_f$) for each building (x) of the at least some of the plurality of buildings along with the total thermal discomfort value ($\Sigma_B \Gamma_x$) of occupants thereof and a peak power value ($P_W^{DR}$) during the DR event, for the initial supply chilled water temperature value ($T_S$) of the DCP;

(j) iteratively perform steps (a) through (i) for remaining supply chilled water temperature values ($T_S$) of the DCP from the predefined range and capturing the associated temperature set point ($T_{SP}$) and the associated lighting intensity factor ($L_f$) for each building (x) of the at least some of the plurality of buildings along with an associated total thermal discomfort value ($\Sigma_B \Gamma_x$) of occupants thereof and an associated peak power value ($P_W^{DR}$) during the DR event, for each of the remaining supply chilled water temperature values ($T_S$); and (k) identify the associated temperature set point ($T_{SP}$) and the associated lighting intensity factor ($L_f$) for each building (x) of the at least some of the plurality of buildings for an associated supply chilled water temperature value ($T_S$) as optimal decision parameters in the event that an associated total thermal discomfort value ($\Sigma_B \Gamma_x$) of occupants thereof is minimum and a snapback condition is satisfied, wherein the snapback occurs when the associated peak power value ($P_W^{DR}$) during the DR event is less than or equal to a peak power value ($P_W^{DR}$) during a non DR event.

* * * * *